United States Patent [19]
Gill et al.

[11] 3,831,024
[45] Aug. 20, 1974

[54] POSITION SENSING APPARATUS

[75] Inventors: Raymond E. Gill; Floyd J. McMahon, both of Peoria, Ill.

[73] Assignee: Westinghouse Air Brake Company, Pittsburgh, Pa.

[22] Filed: Aug. 4, 1972

[21] Appl. No.: 277,947

Related U.S. Application Data

[62] Division of Ser. No. 160,741, July 8, 1971, Pat. No. 3,743,026.

[52] U.S. Cl. .............................. 250/229, 250/231
[51] Int. Cl. ............................................. G01d 5/34
[58] Field of Search ............ 250/231, 229; 172/4.5; 200/61.44

[56] References Cited
UNITED STATES PATENTS

| | | | |
|---|---|---|---|
| 3,032,691 | 5/1962 | Cubellis | 250/231 |
| 3,296,722 | 1/1967 | Curlett | 172/4.5 |
| 3,514,630 | 5/1970 | Steele et al. | 172/4.5 |

*Primary Examiner*—Archie R. Borchelt
*Assistant Examiner*—T. N. Grigsby
*Attorney, Agent, or Firm*—Robert J. Eck

[57] ABSTRACT

A position sensing apparatus mounted on the cutting tool of a surface finishing machine for automatically adjusting the height of said cutting tool; said apparatus having a feeler arm adapted to ride over a reference string being preset at a desired height, and a switch control arm disposed within a dust proof housing and coupled to said feeler arm for opening and closing a photoelectric cell switch within said housing. The cutting tool is raised and lowered by an elevator mechanism, such as a fluid responsive cylinder, of the double-acting type, or hydraulic motor arrangement, which is in communication with an electro-hydraulic valve and operates responsive to the movement of said switch control arm to maintain the height of the cutting tool at the desired level above the ground surface.

3 Claims, 5 Drawing Figures

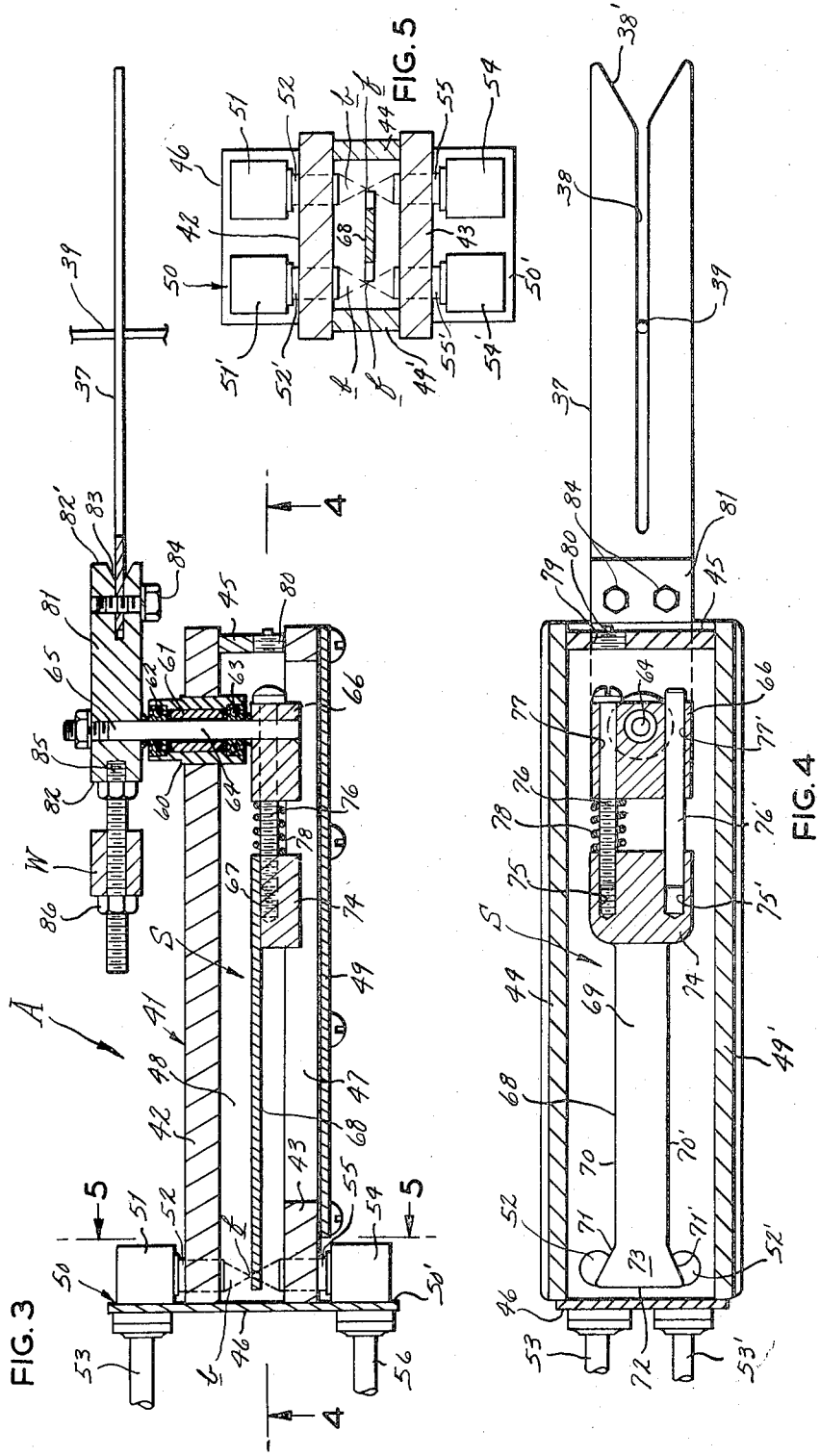

3,831,024

POSITION SENSING APPARATUS

This is a division of U.S. Pat. application Ser. No. 160,741 filed July 8, 1971 and now U.S. Pat. No. 3,743,026.

BACKGROUND AND SUMMARY OF THE INVENTION

The present invention relates in general to surface finishing equipment, and more particularly, to a position sensing apparatus for automatically adjusting the height of a cutting tool therefor.

Surface finishing equipment, such as graders and the like, commonly use string line references to automatically guide and control the height of the cutting tool. The reference string is preset vertically to the desired profile as well as horizontally to the desired path of cut, so that the cutting blade will spread and trim the material to the same profile and path as the reference string.

Heretofore, many expedients have been utilized for effecting the adjustment of a cutting tool relative to the string reference. For example, some prior art string line sensors utilize mechanical devices, such as a mechanically actuated valve being operable responsive to an applied force transmitted by a feeler actuator engaging the reference string. Because of the usual friction and resistance forces developed by the operation of mechanical devices, excessive pressure is exerted on the string causing untoward deflection which decreases the accuracy thereof. Accordingly, in situations where close tolerances are sought, mechanical prior art sensors are unsatisfactory to accomplish the desired result. Other prior art devices have utilized potentiometers, accelerometers, and other highly sensitive electronic devices for accomplishing the desired end result. Such devices required most careful and frequent adjustment because the sensitivity and accuracy of same were affected by the rough handling of the equipment under job conditions. Also, such prior art devices would become ineffective because of the accumulation of dust, grit, and the like which normally accompanies the employment of surface finishing equipment in the field, therefore requiring frequent replacement. Moreover, such devices were extremely delicate, costly in manufacture, and expensive in care and maintenance.

By the present invention, the above disadvantages have been alleviated by using a position sensing apparatus incorporating photoelectric cell switches which are in circuit with an electrohydraulic valve and controlled by a flag arm which is coupled to the wire feeler arm for effecting simultaneous movement therewith. The coupled arrangement between the feeler arm and the flag arm demand the least force against the reference string as no friction or resistance is developed under the flag arm moving through a light beam. The apparatus of the present invention has few moving parts, thereby requiring simple maintenance, being economical in manufacture, and reliable and durable in usage. Said apparatus may be utilized for relatively long periods of time without adjustment, while being capable of precision adjustment within 0.005 inch. Moreover, the position sensing apparatus of the present invention is adjustable so that different tolerances may be readily obtained depending upon the peculiar specifications of the particular job. Additionally, since the position sensing apparatus of the present invention is of relatively simple construction, it may be easily incorporated within existing surface finishing equipment so as to avoid costly modifications and installation.

BRIEF DESCRIPTION OF THE DRAWINGS

FIG. 3 is a horizontal longitudinal section taken through the position sensing apparatus.

FIG. 4 is a vertical section taken on the line 4—4 of FIG. 3.

FIG. 5 is a vertical transverse section taken on the line 5—5 of FIG. 3.

DESCRIPTION OF THE PREFERRED EMBODIMENT

Figure 1:
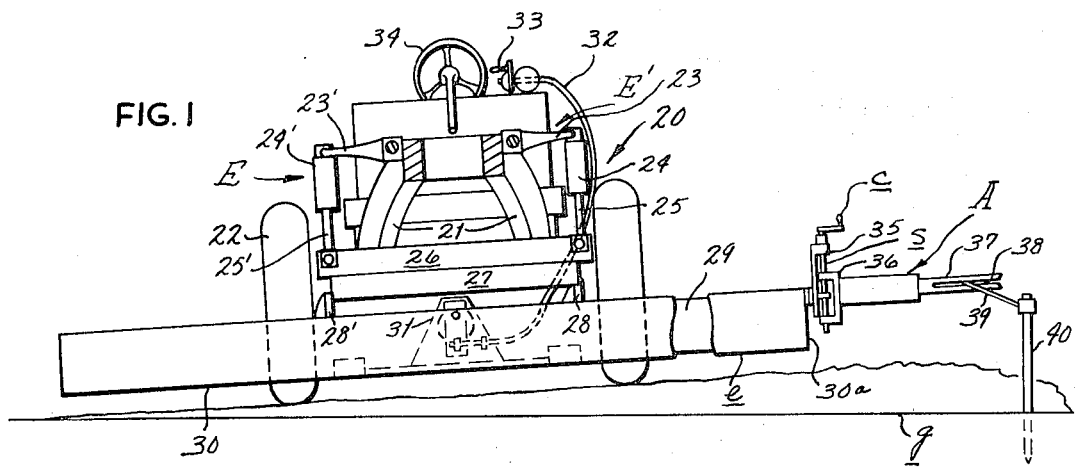
FIG. 1 is a vertical transverse section taken through the frame of a surface finishing vehicle illustrating the cutting blade having mounted thereon a position sensing apparatus constructed in accordance with and embodying the present invention.

Referring now to the drawings wherein like reference characters designate like corresponding parts, there is shown in FIG. 1 a surface finishing vehicle 20, such as a grader or the like, comprising a frame 21 which is supported above ground in usual fashion by a plurality of wheels 22. Fixed to the forward portion of frame 21 on each side thereof is an elevator mechanism E,E', such as the customary lift device 23,23', respectively, each being operatively engaged to a hydraulic ram 24,24', respectively, having an extensible and retractable piston 25,25', of the double-acting type, fixed at its outer end portion to the draw bar 26. Mounted to the underside of draw bar 26 is the conventional circle 27 having fixed at diametrically opposed portions an arcuate support member 28,28', which in turn is connected to the moldboard 29 having an elongate cutting blade 30 secured thereto. Although hydraulic rams 24,24' constitute the preferred embodiment for raising and lowering the cutting blade through the associated structure, it will be understood that a hydraulic motor and worm gear system may be substituted for the hydraulic rams 24,24' to raise and lower blade 30 by rotation.

Mounted to the rearward face of moldboard 29 in the region substantially centrally of cutter blade 30 is a horizon sensor 31, commonly referred to as a pendulum, for adjusting the slope angle of the cutting blade 30. Said pendulum 31 is preset at the desired angle through a cable 32 which projects upwardly for suitable attachment to a hand crank control 33 located in the region adjacent the steering wheel 34.

Mounted on the end edge 30a of cutter blade 30 is an adjustment mechanism 35 being of the guide screw type having a carriage 36 which is threadedly engaged to a screw $s$ for moving upwardly and downwardly responsive to the turning of said screw $s$ by a hand crank $c$, as is well known in the art. Fixed to carriage 36 is the position sensing apparatus A of the present invention having a feeler arm 37 provided with an elongate longitudinal groove 38 for receiving the reference line or string 39 which is supported above ground $g$ at the desired height as by a plurality of stakes 40 or the like as is customarily accomplished in grading procedures. As will be seen hereinbelow, both the pendulum 31 and the position sensing apparatus A cooperate to maintain the edge e of the cutting blade 30 at the desired cutting height and angle.

Referring to FIGS. 3 and 4 of the drawings, position sensing apparatus A comprises a housing 41 having a top wall 42, a bottom wall 43, side walls 44, 44', a front end wall 45 and a rear end wall 46; said bottom wall 43 having an aperture 47 opening into a compartment 48 defined by the walls of housing 41. Said aperture 47 is closed by a cover plate 49 for maintaining housing 41 in a dust-proof condition. Although the aperture 47 is illustrated as being relatively large, it will be understood that same may be considerably smaller and closed with a plug or the like instead of the cover plate 49, if so desired.

Said rear wall 46 of housing 41 is fixed to the aforesaid carriage 36 of adjustment mechanism 35. Said rear wall 46 is of greater height than housing 41 having upper and lower end portions projecting beyond the related top and bottom walls 42,43 for developing upper and lower flanges 50,50', respectively. Suitably mounted to said upper flange 50 are a pair of axially spaced-apart light source heads 51,51', each having a cylindrical body 52,52' which is snuggly received within appropriate openings (not shown) within said top wall 42. Each light source head 51, 51' project a beam of light b, indicated in phantom lines in FIG. 3, into said compartment 48; said heads 51,51' being adjustably mounted on upper flange 50 so that the focal point f of light beams b are positioned in planar alignment with the longitudinal axis of housing 41. Said light source heads 51,51' are in circuit through leads 53,53' to a convenient source of power, such as vehicle battery B, for supplying a continuous source of power so that a light beam b is projected at all times during operation.

Figure 2:
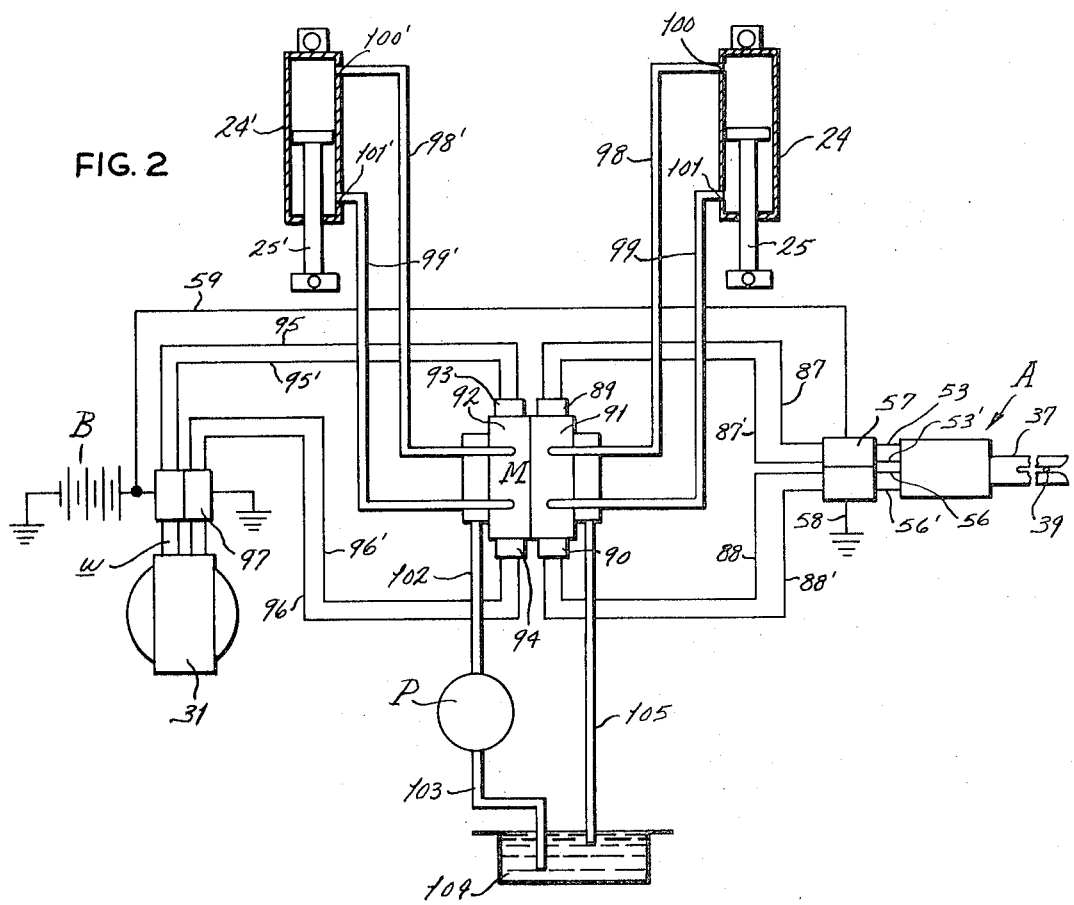
FIG. 2 is a schematic diagram of the electrohydraulic system of the present invention.

Mounted to the lower flange 50' are a pair of sensing heads or receivers 54,54' each having a cylindrical body 55,55' positioned within a suitable opening in bottom wall 43 in axial alignment with the opposed cylindrical bodies 52,52' of the light source heads 51,51'. Each of said sensing receivers 54,54' are adapted to receive said light beam b for closing a circuit, as will be seen; each sensing receiver 54,54' being connected by leads 56,56' to an amplifier 57 (FIG. 2), one side of which is connected to ground by lead 58, the other side to the battery B by lead 59.

Spaced rearwardly from front wall 45, said top wall 42 is provided with an opening (not shown) for receiving a sleeve 60 which houses a bushing 61 interposed between upper and lower bearing assemblies 62,63, respectively, for accommodating the shank 64 of a couple pin 65.

The lower end portion of couple pin 65 projects within compartment 48 where same is fixed within a mounting block 66 which constitutes the forward end portion of a sensor control member S presented longitudinally within housing 41. Said sensor control member comprises a flag arm 68 having a forward end portion 67 which is disposed spacedly rearwardly of the mounting block 66 and merges into a relatively narrow, elongate shank 69 having side edges 70,70' diverging outwardly endwise into flared margins 71,71' in the region adjacent said light beams b. Said flared margins 71,71' terminate into a rearward end edge 72 for developing a triangular-shaped tongue 73.

Secured to the under face of the forward end portion 67 of flag arm 68 there is a block 74 having a pair of spaced-apart bores 75,75'; the bore 75 being internally threaded for threadedly receiving the end portion of an adjustment screw 76, and the bore 75' being smooth for slidably accommodating the end portion of a dowel pin 76'. Both the adjustment screw 76 and the dowel pin 76' project forwardly and outwardly of said block 74 into axially aligned bores 77,77' formed within said mounting block 66. Interposed between said blocks 66 and 74 surroundingly of adjustment screw 76, there is a spring 78 for normally biasing said blocks 66 and 74 away from each other. Access is provided to adjustment screw 76 through a threaded opening 79 tapped within said front end wall 45, which opening 79 is adapted to threadedly receive a removable plug 80. Thus, by removing the plug 80 and turning adjustment screw 76, the flag arm 68 may be moved longitudinally forwardly and rearwardly within said housing 48 for altering the relative position of the flared margins 71,71' of tongue 73 in relation to the light beams b. For purposes to be presently seen, the flared margins 71,71' normally overlie the sensing receivers 54, 54' so that the light beams b are blocked from being transmitted thereto.

The upper end portion of couple pin 65 projects outwardly of the sleeve 60 for threaded engagement within a mounting block 81 having a rearward end wall 82 and a forward end wall 82', the latter having a transverse slot 83 provided therein. Received within the slot 83 is the rearward end portion of said feeler arm 37 which is maintained therein as by conventional screws 84. The feeler arm 37 is fabricated from a highly resilient strong material, such as fiberglass, and projects forwardly of the mounting block 81 with its forward end portion being formed with a V-shaped cutout 38' which tapers inwardly and rearwardly into said elongate slot 38. It will be observed that mounting blocks 81 and 66 are fixed to couple pin 65 so that both blocks 81 and 66 will move through the same angle upon being turned. Therefore, through the positive connection between said blocks 81 and 66 the flag arm 68 will pivot about the axis of couple pin 65 through the same angle as feeler arm 37. Accordingly, when the feeler arm 37 is moved by its engagement with reference string 39 said flag arm 68 will be moved through the like angle.

Fixed within said rearward end wall 82 of mounting block 81 is a threaded shank 85 upon which is received a balance weight W adapted for axial movement on threaded shank 85. Said balance weight W is maintained at a preselected position by a lock nut 86. Because of the positive connection between feeler arm 37 and flag arm 68 by moving balance weight W forwardly and rearwardly on the threaded shank 85 the balance between feeler arm 37 and flag arm 68 may be readily adjusted. It will be understood, that balance weight W may be conveniently provided on the shank 69 of flag arm 68 if so desired with access being provided through the removable cover plate 49.

Depending on which direction the flag arm 68 is pivoted responsive to the movment of feeler arm 37, one of said flared margins 71,71' of tongue 73 will swing out of blocking engagement with the related light beam b for permitting transmittal of same to the immediately underlying sensing receivor 54 or 54' for closing the circuit. The signals emitted by the sensing receivers 54,54' are transmitted to the amplifier 57 through the leads 56,56' for enhancing the emitted signal. Said amplifier is connected through leads 87,87' and leads 88, 88' to electric solenoids 89,90, respectively, which solenoids 89,90 are positioned on the opposed ends of a spool valve 91 incorporated within a master valve M. Also incorporated in master valve M is another spool valve 92 disposed immediately adjacent to and in parallel relationship with said spool valve 91; said spool valve 92 being controlled by solenoids 93,94 which are connected by leads 95,95' and leads 96,96', respectively, to an amplifier 97 being in circuit through conduits collectively designated w, to said pendulum 31.

Said spool valves 91,92 of master valve M are in paired relationship, said spool valve 91 being in communication with hydraulic ram 24 by conduits 98,99 which are connected through ports 100,101, respectively, located adjacent the opposed end portions of said hydraulic ram 24, and spool valve 92 being in communication with the hydraulic ram 24' by conduits 98,99', which are connected through ports 100',101', respectively located adjacent the opposed end portions of said hydraulic ram 24'.

Said master valve M is connected by conduit 102 to the discharge side of a pump P, the intake side of which is connected by conduit 103 to a reservoir 104 of hydraulic fluid, said reservoir 104 also being connected to master valve M by return line 105. Therefore, by selective energization of solenoids 89,90 and 93,94, through signals emitted by either position sensing apparatus A or the pendulum 31, respectively, said hydraulic rams 24,24', respectively, will effect the raising and lowering of said cutting blade 30.

In operation, with the reference string 39 being received within the slot 38 of feeler arm 37, the flag arm 68 will be pivoted about the axis of couple pin 65 through a like angle as feeler arm 37. In the event that a deeper cut is dictated by a lowering of the reference string 39, relative to the ground surface g, said feeler arm 37 will be moved correspondingly downwardly and flag arm 68 will be moved through a like angle, thereby permitting the light beam b of sensor head 51' to be received within sensing receiver 54' for closing a circuit. The amplifier 57 directs the signal from sensing receivor 54' through leads 88,88' for energizing solenoid 90 which establishes communication between conduits 102 and 98 for supplying hydraulic fluid to ram 24. Upon entering ram 24 the fluid will push piston 25 downwardly for lowering the cutting blade 30 until the tongue 73 of flag arm 68 again blocks the light beam b through the return of feeler arm 37 to the proper straddling relationship with reference string 39. The fluid within ram 24 on the downward side of piston 25 will pass through port 101 for return through conduit 99 and master valve M through return line 105 to the reservoir 104. Similarly, when the feeler arm 37 is moved upwardly as it follows the reference string 39, the circuit is completed through sensor receiver 54 for emitting a signal through leads 87,87' for energizing solenoid 89 wherein fluid from reservoir 104 will be pumped through conduit 102 and 99 for raising the piston 25, and hence the cutting blade 30. The fluid within ram 24 on its upward side will be returned through conduit 98 and return line 105 to the reservoir 104.

Thus, it will be observed that as the feeler arm moves upwardly and downwardly as it travels along the reference string 39 the flag arm will move through a like angle for opening and closing circuits through the sensing receivers 54 and 54' for alternatively energizing solenoids 89 and 90, respectively, which effect supply of fluid to the hydraulic ram 24, which in turn retracts and extends the piston 25 for elevating and lowering the cutting blade 30. Accordingly, the proper height of the cutting blade may be achieved at all times through out the operation of the surface finishing equipment 20.

In the same manner, the pendulum 31 effects the extension and retraction of piston 25' of hydraulic ram 24' for raising and lowering the angle of the cutting blade 30. Since the pendulum 31 does not form an integral part of the present invention, the detailed description of the same is unnecessary.

Through the adjustment screw 76, the flag arm 68 may be adjusted longitudinally within housing 48 so that the flared margins 71 and 71' may be positioned at the focal point f of both light beams b. With the tongue so centered, accuracy to 0.005 inch of travel of the wire feeler arm 37 may result in an adjustment of the cutting blade 30. Since the work accomplished by the flag arm 68 passing through light beam b is a frictionless operation, apparatus A offers a more reliable sensing instrument than heretofore thought possible. The accuracy of the flag arm 68 may be increased or decreased depending upon the job conditions by merely turning adjustment screw 76 so as to move the flared margins 71 and 71' of tongue 73 either closer to the focal point f of the light beams b or further away.

Having thus described our invention, what we claim and desire to obtain by Letters Patent is:

1. A position sensing apparatus operable responsive to the position of a preset reference string comprising:

Means defining a housing;
Switch means within said housing including:
light projecting means, and
first and second light responsive switches disposed in aligned relationship with said light projecting means;
A switch control arm rockably mounted within said housing for energizing said switch means, said switch control arm having a first end portion and a second end portion;
The second end portion of said switch control arm being normally presented between said light projecting means and said first and second light responsive switches for maintaining same in a circuit-opened condition, said second end portion having a width greater than the distance between the centers of said first and second light responsive switches;
A rockably mounted feeler member disposed exteriorally of said housing and having an elongate slot for receiving said reference string, said feeler member being presented in a plane being in parallel, spaced-apart relationship with the plane containing said switch control arm;
Means coupling said feeler member to the first end portion of said switch control arm for effecting simultaneous movement therewith so that upon swinging of said feeler member, the switch control arm will swing to close the circuit between the light projecting means and one of said first and second light responsive switches.

2. A position sensing apparatus as defined in claim 1 and further characterized by:
Said switch control arm having side edges;

The second end portion of said switch control arm having flared margins diverging outwardly of said side edges for defining a triangular-shaped tongue;

Said tongue being normally presented in blocking relationship between said light projecting means and said first and second light responsive switches.

3. A position sensing apparatus as defined in claim 2 and further characterized by:

Adjustment means carried by the first end portion of said switch control arm for moving same longitudinally within said housing to adjust the position of said flared margins of said triangular-shaped tongue relative to the distance between the centers of said first and second light responsive switches.

* * * * *